United States Patent [19]

Parks et al.

[11] 3,776,113

[45] Dec. 4, 1973

[54] OPTICAL ARRANGEMENT FOR GRAPHICAL PLOTTERS

[75] Inventors: Robert G. Parks, Azusa; Bruce D. Jimerson, San Pedro, both of Calif.

[73] Assignee: California Computer Products, Inc., Anaheim, Calif.

[22] Filed: Aug. 31, 1972

[21] Appl. No.: 285,202

[52] U.S. Cl. .............................. 95/12, 95/1, 346/29
[51] Int. Cl. .............................. G03b 29/00
[58] Field of Search .............................. 95/1, 12; 346/29; 178/6.7, 7.4, 45

[56] References Cited

UNITED STATES PATENTS

| | | | |
|---|---|---|---|
| 3,573,847 | 4/1971 | Sacerdoti | 95/4.5 |
| 3,506,779 | 4/1970 | Brown | 178/6.6 |
| 3,610,119 | 10/1971 | Gerber | 95/12 |

*Primary Examiner*—John M. Horan
*Attorney*—John A. Duffy et al.

[57] ABSTRACT

A collimated light source may be mechanically deflected in a cartesian reference frame to record graphical data on photosensitive media. Conventional or special high speed electromechanical plotting apparatus may be used to implement deflection.

2 Claims, 2 Drawing Figures

OPTICAL ARRANGEMENT FOR GRAPHICAL PLOTTERS

BACKGROUND OF THE INVENTION

Prior art light recording techniques typically utilize a light head which is adapted to attach to the carriage of an electromechanical plotter. Such devices are described in U.S. Pat. Nos. 3,464,330 by E.V. Lewis entitled "Optical Writing Head;" 3,323,414 by D.S. Ritchie entitled "Apparatus for Automatically Copying Lines;" 3,330,182 by H.J. Gerber, et al., entitled "Device for Exposing Discrete Portions of a Photosensitive Surface to a Variable Intensity Light Beam." A paramount problem with such an arrangement is that most of these light heads are extremely costly and complex. They require numerous control signals, and the added inertia is deleterious to overall systems performance. In addition, the high acceleration which the units are subjected to when used with incremental plotting equipment is detrimental to fragile components. What is actually desired is a fixed light source having a narrow beam which can be deflected in an X–Y coordinate fashion to produce a graphical plot. Prior art technique for deflecting light beams (like that described in U.S. Pat. No. 3,245,083 by G.P. Wilson entitled "Direct Writing Oscillograph") are not suitable for accurate graphical recording since equal increments of angular rotation do not produce equal increments of linear deflection on a flat surface.

Accordingly, a primary object of the present invention is to provide a system for producing the deflection of a light beam in either the X or Y coordinate which is proportional to a deflection signal.

Another object of the present invention is to provide a system for recording graphical data on photosensitive medium using a stationary light source.

Other objects and advantages of the present invention will be obvious from the detailed description of a preferred embodiment given herein below.

SUMMARY OF THE INVENTION

The aforementioned objects are realized by the present invention which comprises a stationary light source for emitting a collimated beam and a pair of mirrors which are mounted on beam and carriage of a mechanical plotter. The 1st mirror deflects the beam to the second mirror where it is deflected to the recording medium.

DESCRIPTION OF A PREFERRED EMBODIMENT

Figure 1:
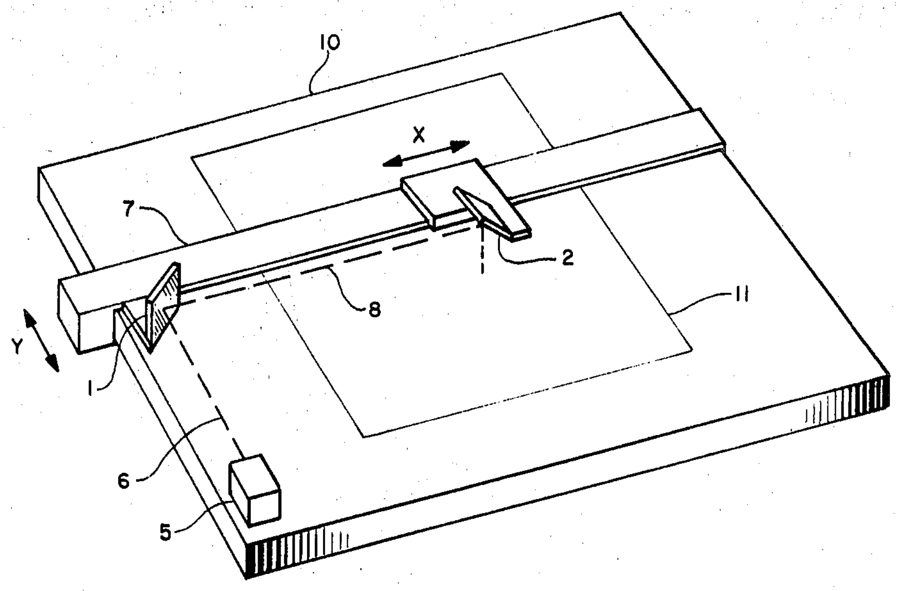
FIG. 1 shows a preferred embodiment of the invention utilizing a conventional electromechanical plotting apparatus to produce the requisite X and Y positioning of the mirrors.

Adverting to the drawings and particularly FIG. 1, a preferred embodiment of the invention comprises a stationary light source 5 which generates a collimated light beam 6 parallel to one of the primary plotting axis (in the case shown it is the Y axis). The mirror 1 is attached to the plotter beam 7 so that its plane is vertical and at a 45° angle with respect to the coordinate axis. As a consequence, the light beam 6 is deflected parallel to the plotter beam as indicated by the path 8 until it strikes the carriage mirror 2. The plane of the carriage mirror 2 is at an angle of 45° with respect to the plane of the platen 10 of the plotter and at an angle of 45° with respect to the reflected beam 8. Consequently, carriage mirror 2 deflects the beam 8 directly downward where it strikes the photosensitive recording medium 11.

In operation, when the beam is moved in a conventional manner, the light spot on the recording medium is deflected in the Y axis whereas motion of the carriage produces deflection of the spot in the X direction. Motion of the beam and carriage is thus used to effectuate X–Y plotting in a manner identical to that which would result if a conventional ink pen were utilized.

Figure 2:
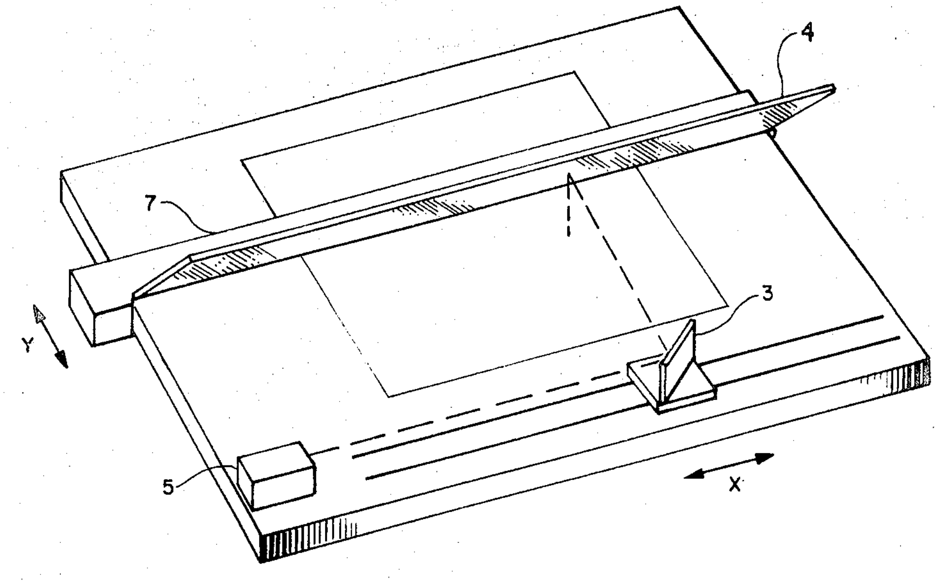
FIG. 2 shows an alternative high speed plotting apparatus wherein the beam and carriage are physically separated.

FIG. 2 shows another embodiment wherein the carriage is separated from the beam. Such an arrangement is advantages where high speed is required since the beam (being no longer required to support the carriage) can be much lighter. Independent actuation of the beam and carriage also simplifies the mechanical design considerably. The length of the beam mirror 4 in this case is co-extensive with the width of the plotting surface (i.e., the X axis).

The light source 5 may be a laser or any other source capable of being collimated into a narrow beam (the intensity of which is fairly constant over the plotting range). Additional apparatus for blanking, masking, width and intensity control, etc. may be incorporated in the light source 5 utilizing technology similar to that described in the above referenced patents to Ritchie and Gerber.

The basic concept of the invention is not limited to plotters. It may be applicable to any system which requires cartesian deflection of light beams such as military displays, advertising signs, etc. Nor is deflection arrangement restricted to conventional electromechanical means for physically moving the beam and carriage.

Thus, although a preferred embodiment has been shown and described, it will be understood that the invention is not limited thereto and that numerous changes, modifications and substitutions may be made without departing from the spirit of the invention.

We claim:

1. An apparatus for cartesian recording on a flat photosensitive medium comprising:
   - a stationary light source means for producing a collimated beam parallel to the 1st major plotting axis;
   - 1st mirror means for reflecting the collimated beam parallel to the 2nd major plotting axis;
   - means for moving said 1st mirror means parallel to said 1st plotting axis;
   - 2nd mirror means for reflecting the beam which is reflected from said 1st mirror means so that the beam strikes the photosensitive recording medium;
   - means for moving said 2nd mirror means parallel to said 2nd plotting axis.

2. The apparatus recited in claim 1 wherein said light source means comprises a laser.

* * * * *